United States Patent [19]
Kraft

[11] 3,775,931
[45] Dec. 4, 1973

[54] METHOD AND APPARATUS FOR PACKAGING POULTRY UTILIZING CONTROLLABLY ACTUATED POSITIVE PRESSURE LIFTING MEANS

[75] Inventor: Kenneth A. Kraft, Milwaukee, Wis.

[73] Assignee: John Mohr & Sons, Chicago, Ill.

[22] Filed: Feb. 10, 1972

[21] Appl. No.: 225,183

[52] U.S. Cl. .................. 53/22 B, 53/112 B, 141/46
[51] Int. Cl............................................. B65b 31/06
[58] Field of Search .................. 53/22, 22 B, 112 B; 141/1, 46, 8, 65

[56] References Cited
UNITED STATES PATENTS

| | | | |
|---|---|---|---|
| 3,527,018 | 9/1970 | Jahnke | 53/112 B |
| 3,312,256 | 4/1967 | Reisinger | 53/112 B |
| 2,681,757 | 6/1954 | Kellersman | 141/46 X |

Primary Examiner—Andrew R. Juhasz
Assistant Examiner—W. D. Bray
Attorney—Howard T. Markey et al.

[57] ABSTRACT

A bagged poultry vacuumizing and lifting machine in which lifting of the bagged poultry occurs by application of greater than atmospheric fluid pressure to the lifting mechanism, said lifting action being entirely independent of the vacuumizing action. A unique quick connect and disconnect system consisting of a minimum of parts is also disclosed.

9 Claims, 8 Drawing Figures

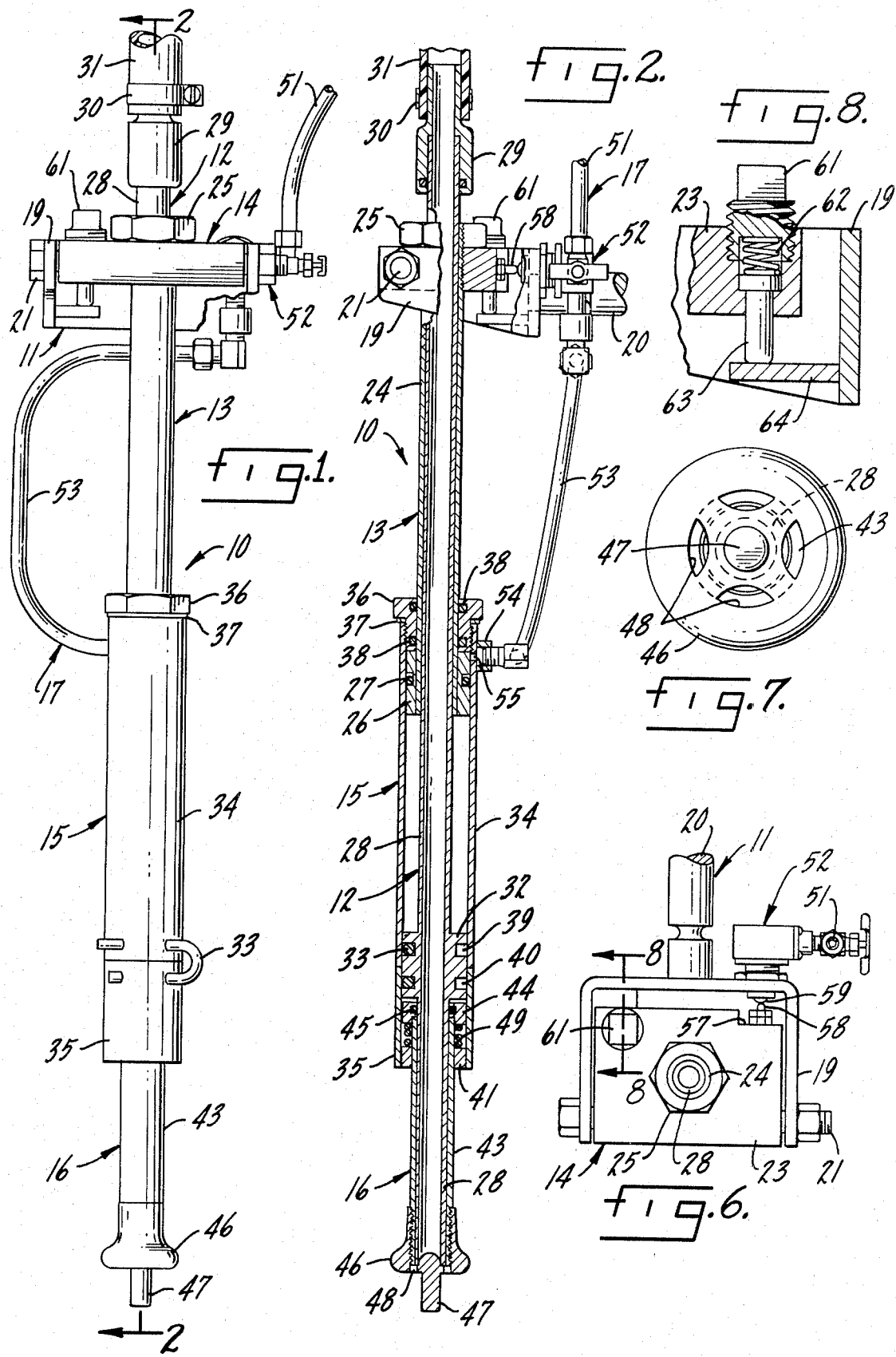

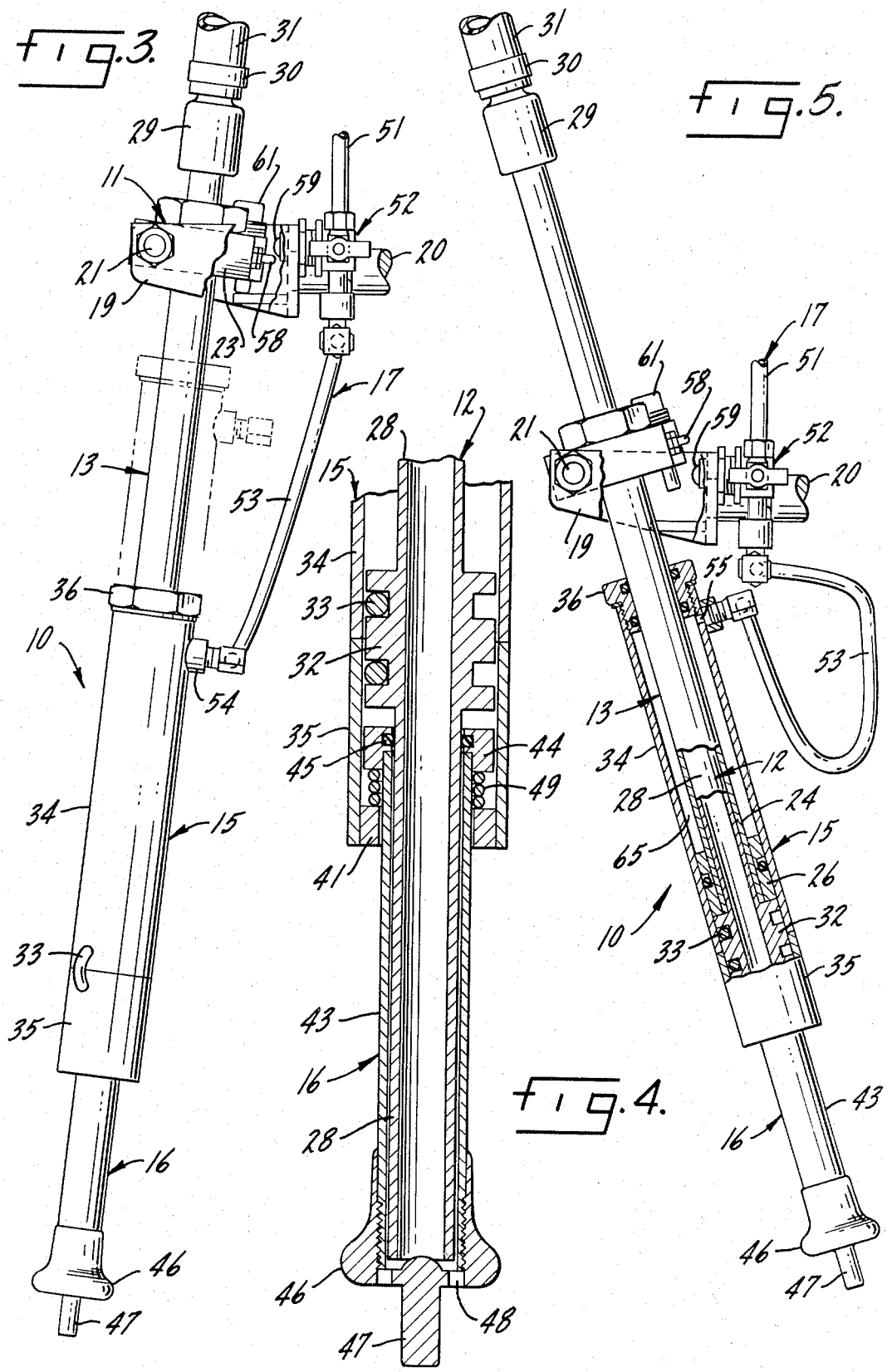

METHOD AND APPARATUS FOR PACKAGING POULTRY UTILIZING CONTROLLABLY ACTUATED POSITIVE PRESSURE LIFTING MEANS

BACKGROUND

This invention relates to poultry packaging, and specifically to a method and apparatus for vacuumizing and lifting bagged poultry which utilizes controllably actuated positive pressure lifting means.

Prior poultry packaging apparatus of the general type described above have all had one or more drawbacks which have prevented the widespread adoption of any one type.

Thus, some machines, which for the sake of brevity may be described as vacuumizers, are so designed that the operator must physically lift each bird to be processed. This is tiresome and contributes to operator fatigue.

Other machines have reduced operator effort, but have other disadvantages. Thus, for example, a machine of relatively recent vintage has substantially reduced operator effort by merely requiring the operator to impart a slight downward tug or pull on a spring biased handle, and thereby actuate a vacuum system in which, upon attainment of a vacuum of a given magnitude within the bagged poultry, the poultry is lifted. Two drawbacks of this system are that the action is not as rapid as may be desired, since there is necessarily a time lag until the requisite degree of vacuum is obtained, and the slightest leak or system malfunction in the vacuum system can result in shutdown due to an insufficient degree of vacuum. This can be particularly serious when a series of stations are connected to a single vacuum source, as is usually the case.

SUMMARY OF THE INVENTION

Accordingly, a primary object is to provide a method and apparatus for packaging bagged poultry in which the lifting action is derived from the application of a greater than atmospheric positive air pressure to a lifting mechanism.

Another object is to provide a method and apparatus as above described which does not rely on the creation of a vacuum of any magnitude to initiate the lifting action.

Another object is to provide a method and apparatus as above described which has fewer parts, is less complicated, and is more foolproof in operation than present poultry packaging machines.

Another object is to provide a method and apparatus for packaging poultry as above described, in which vacuumizing is initiated by a simple downward tug on a handle grasped by the operator, and lifting action is initiated by a nearly effortless swinging of the apparatus in either of two directions, said machine being so arranged that the lifting action can be initiated before vacuumizing is complete, or even commenced, if desired.

Other advantages and objects of the invention will become apparent from a reading of the following description of the invention.

BRIEF DESCRIPTION OF VIEWS

The invention is illustrated more or less diagrammatically in the accompanying drawing, wherein:

FIG. 1 is a side view of the vacuumizer and lifter of this invention in a neutral, inactive position;

FIG. 2 is a section view taken substantially along the line 2—2 of FIG. 1 with parts broken away;

FIG. 3 is a view illustrating movement of the combined vacuumizing and lifting device in a first direction which is effective to initiate the lifting action;

FIG. 4 is a detail section view to an enlarged scale as compared to FIG. 2, illustrating the relative position of parts during the vacuumizing action;

FIG. 5 is a section view illustrating movement of the lifter in a second direction which is effective to initiate the lifting action, and showing the lifter in a lifted condition;

FIG. 6 is a top plan view with parts in section;

FIG. 7 is a bottom view; and

FIG. 8 is a detail view of the pin stop mechanism to an enlarged scale taken substantially along line 8—8 of FIG. 6.

DETAILED DESCRIPTION

Like reference numerals will be used to refer to like parts throughout the following description of the figures.

The lifter, which is indicated generally at 10 in FIG. 1, includes a support means indicated generally at 11, a vacuum tube assembly indicated generally at 12, a piston assembly indicated generally at 13, a mounting block assembly indicated generally at 14 which connects the piston assembly to the support means, a housing assembly indicated generally at 15, a handle assembly indicated generally at 16, and an air pressure supply system indicated generally at 17.

The support means 11 includes a mounting bracket assembly 19, a mounting bar 20 which is fast with the mounting bracket assembly, and a mounting bolt 21. It will be understood that when installed, the mounting bar 20 will be secured to a suitable framework.

A mounting block 23 is pivotally connected to the mounting bolt 21. Block 23 has a threaded hole therein which receives the upper threaded end of a sleeve 24 which is secured to the mounting block by block nut 25. The lower end of sleeve 24 carries an annular ring member 26 which, as best seen in FIGS. 2 and 5, is slidably received within housing assembly 15.

Vacuum tube assembly 12 includes an elongated tube structure 28 which is connected by a vacuum coupling 29 and clamp 30 to a vacuum hose 31. An expanded section 32 of tube structure 28 forms part of a quick connect and disconnect assembly which will later be described in detail.

Housing assembly 15 includes an upper housing 34 and lower housing 35. The upper housing is threadably connected to a nut 36 having an aperture suitably sized to slide along the upper end of tube structure 28. A gasket is indicated at 37, and a pair of O-ring seals at 38.

The lower housing 35 is connected to upper housing 34 by a generally U-shaped connector pin 33 which passes through aligned apertures in the upper and lower housings, and annular recesses 39, 40 in the expanded section 32 of the tube structure 28. The lower end of housing 35 carries a spring abutment ring 41.

Handle assembly 16 includes a sleeve 43 which is fast, at its upper end, with a spring abutment ring 44 which in turn carries an O-ring seal 45. The lower end of the handle assembly is threadably connected to a knob member 46 which has a projecting tip 47. As best seen in FIGS. 2, 4 and 7, the undersurface of knob 46 is apertured as at 48. A spring 49 biases sleeve 43 upwardly as indicated in FIG. 2, so that the lower end of sleeve 24 shuts off fluid communication from below knob 46 as shown best in FIG. 2. The bottom of tube structure 28, in conjunction with the upper surface of the bottom portion of knob 46, thereby functions as a valve for opening and closing communication with the interior of tube structure 28 and the exterior of knob 46.

The air pressure system 17 includes a fluid pressure line 51 connected to any suitable fluid pressure source, such as the conventional compressed air line found in all shops, and leads to an air valve indicated generally at 52. Valve 52 is a two-way valve arranged to open, or shut off, communication between line 51 and line 53, which connects the downstream side of the air valve to the housing assembly 15.

As best seen in FIG. 2, the downstream end of line 53 terminates in a fitting which is threadably received in a short collar 54 which opens into upper housing 34 via inlet aperture 55. Since annular ring member 26 carries an O-ring seal 27, and escape of pressure fluid upwardly is precluded by gasket 37 and O-ring seals 38, it will be noted that a fluid pressure chamber is formed between nut 36 and ring member 26, which pressure chamber is in communication with fluid pressure line 51.

Mounting block 23 is recessed as at 57 to receive an adjustable pin 58 which operates air valve 52. Thus, it will be noted from FIGS. 2 and 6, that when the lifter is in the neutral, inactive position of FIGS. 1 and 2, pin 58 depresses the air valve shut-off member 59 which in turn closes air valve 52. The valve, which may be any one of several conventional types on the market, is not further illustrated or described in detail, since its primary function is to connect or shut off air pressure in line 51 from the air pressure system beneath the valve 52. For a further detailed description of air valve 52, reference is made to U.S. Pat. No. 3,036,589.

Structure for maintaining the lifter in a neutral position is indicated best in FIGS. 1–3, 5 and 8. As best seen in FIG. 8, the stabilizing mechanism includes a plug 61 which is threadably received in mounting block 23. A seat is formed in the lower end of plug 61 for reception of a spring 62 which bears against a stop pin 63. When the lifter is in the position of FIGS. 1 and 2, stop pin 63 bears against an abutment 64 extending outwardly from the mounting bracket assembly 19.

It will be noted that when the lifter is in the vertical position of FIGS. 1 and 2, or in the counter-clockwise tilted position of FIG. 5, stop pin 63 is fully extended. However, when the lifter is in the clockwise tilted position of FIG. 3, the stop pin is depressed against the bias of spring 62. As will be noted from a comparison of FIGS. 2, 3 and 5, the air valve shut-off member 59 is open in either of the positions of FIGS. 3 and 5, and closed only when the lifter is in the vertical or neutral position of FIGS. 1 and 2.

The use and operation of the invention are as follows.

It will be understood that in the conventional operation of a poultry bagging assembly line, a bird will either arrive at a vacuumizing station in a bagged condition with the cavity end of the bird open to the open end of the bag, or, in some instances, the operator will place the bird, open end cavity up, into the bag. In any event, the operator places the bagged bird beneath handle assembly 16 and aligns the lower end of the handle assembly into the open end of the bird cavity. The upper end of the bag is slipped over the sleeve 43 and the operator grasps the bag around the sleeve, thereby forming a seal between the bag and the sleeve.

Following grasping of the bag around the handle, the operator imparts a slight downward tug or a pull on knob 46, which moves handle sleeve 43 from the sealed position of FIG. 2 to the vacuumizing position of FIG. 4. Since in normal operation the tube structure 28 is continuously connected to a vacuum, vacuum will immediately begin to be created within the bird and bag.

The operator then pulls or pushes handle assembly 16 toward or away from her as illustrated, respectively, in FIGS. 3 and 5. In either event, pin 58 will break contact with air valve shut-off member 59 and air valve 52 will be opened to permit passage of high pressure fluid therethrough.

High pressure fluid passing through line 53 enters expandable chamber 65 through inlet aperture 55. Since piston assembly 13 is fixed with respect to mounting block 23, the housing assembly 15 will be driven upwardly as the high pressure fluid presses against the underside of nut 36. The housing assembly is illustrated in the lifted, operative position in phantom in FIG. 3, and in solid lines in FIG. 5.

In this position, the bagged bird which has been lifted from the work table may be swung to a clip and cut-off machine as is conventional in the art.

It will be understood that the operator will exert no lifting motion at any time during the cycle. It is only necessary for the operator to firmly clasp the upper open end of the bag on handle sleeve 43 so that atmospheric pressure cannot bleed into the top of the bag. The effect of the vacuum within the bag, i.e., the atmospheric pressure acting on all sides of the bag, will maintain the bird pressed against the lower end of the handle assembly.

Likewise, it should be understood that in normal operation the operator will not impart discrete, separate motions to the handle assembly, that is, a downward tug followed by a pushing or pulling motion. In practice, the operator's motion will invariably be a combination of a downward tug and a pushing or pulling motion, so that the bird will be lifted as the package is being vacuumized. It will thus be noted that no time delay to accommodate the vacuumizing action is required as is the case in the machine of recent vintage earlier referred to. The lifting action can commence simultaneously with the vacuumizing, or even prior thereto, the net effect of which is a faster operation and consequently a higher number of cycles per unit time.

After clipping and cut-off, the operator swings the lifter back to the starting or neutral position of FIGS. 1 and 2, preparatory to the next cycle. Movement of the lifter to the neutral position will cause depression of air valve shut-off member 59 as pin 58 comes in contact with it, thereby shutting off fluid pressure through air valve 52. With the termination of pressure in chamber 65, the housing assembly and its associated structure will sink by gravity to the position of FIG. 2.

The quick connect feature illustrated best in FIGS. 1 and 2 is unique in that a substantial number of individually machined, and therefore expensive, components have been eliminated by merely providing an expanded, grooved section to the vacuum tube 28. With this arrangement the operator, at the end of a run, merely pulls pin 33, which thereby disconnects lower housing assembly 35 from upper housing assembly 34 for rapid cleaning. The assembly is reconnected by merely re-inserting vacuum tube assembly 28 and 32 into upper housing 34, re-inserting lower housing 35, and popping connecting pin 33 into the aligned apertures.

If desired, the lower end of annular ring 26 may be cleaned by merely manually sliding upper housing assembly 34 upwardly to thereby expose the expanded section 26 of sleeve 24. This also provides access to O-ring 27.

From the above description of the invention, it will be noted that modifications in design may be made within the spirit and scope of the invention. Accordingly, the foregoing description is intended to be exemplary only, the scope of the invention being defined by the hereafter appended claims.

I claim:

1. In a combined bagged poultry vacuumizing and lifting apparatus, the combination of
   means for creating a vacuum in a bagged poultry,
   means for lifting the bagged poultry by positive fluid pressure,
   said lifting means being operable independently of the vacuum in the bagged poultry whereby said vacuumizing and said bagging operations may occur simultaneously, and
   a support means for said vacuum means and lifting means.

2. The bagged poultry vacuumizing and lifting apparatus of claim 1 further characterized in that
   the vacuum creating means includes
   a vacuum line,
   a valve associated with a handle in said vacuum line, and
   means for biasing the valve and handle to a closed position.

3. The bagged poultry vacuumizing and lifting apparatus of claim 1 further characterized in that said lifting means includes
   a housing assembly carried by said support means,
   said housing assembly being moveable between an extended position and a retracted, lifted position,
   said vacuum means includes
   a vacuum assembly moveable between an extended position and a retracted, lifted position,
   said housing assembly and vacuum assembly forming therebetween a fluid pressure chamber,
   means for moving said vacuum assembly with said housing assembly from an extended position to a retracted, lifted position,
   said moving means including
   a source of air pressure opening into said fluid pressure chamber via a fluid pressure line,
   valve means in said fluid pressure line,
   said valve means being operable in response to movement of said housing assembly relative to said support means.

4. The bagged poultry vacuumizing and lifting apparatus of claim 3 further characterized in that
   the vacuum creating means further includes
   a vacuum line,
   a valve associated with a handle in said vacuum line, and
   means for biasing the valve and handle to a closed position.

5. The bagged poultry vacuumizing and lifting apparatus of claim 3 further characterized
   firstly, in that
   said housing assembly is pivotally mounted with respect to the support means, and
   secondly, in that said valve means is actuated by pivotal movement of said housing assembly.

6. A method of vacuumizing and lifting bagged poultry, said method including the steps of
   securing bagged poultry to a vacuumizing and lifting apparatus,
   initiating creation of a vacuum within the bagged poultry, and
   lifting said bagged poultry by application of positive air pressure to said vacuumizing and lifting device,
   said lifting of said bagged poultry occurring independently of creation of a vacuum within said bagged poultry.

7. The method of claim 6 further characterized in that
   the application of positive air pressure is initiated by pivotal movement of the vacuumizing and lifting apparatus.

8. The method of claim 6 further characterized in that the steps of creation of a vacuum within the bagged poultry and lifting said bagged poultry overlap.

9. The method of claim 8 further characterized in that
   the application of positive air pressure is initiated by pivotal movement of the vacuumizing and lifting apparatus.

* * * * *